F. A. WAGNER & F. H. HARTZELL.
TRANSMISSION MECHANISM.
APPLICATION FILED MAR. 20, 1916.
1,193,089. Patented Aug. 1, 1916.
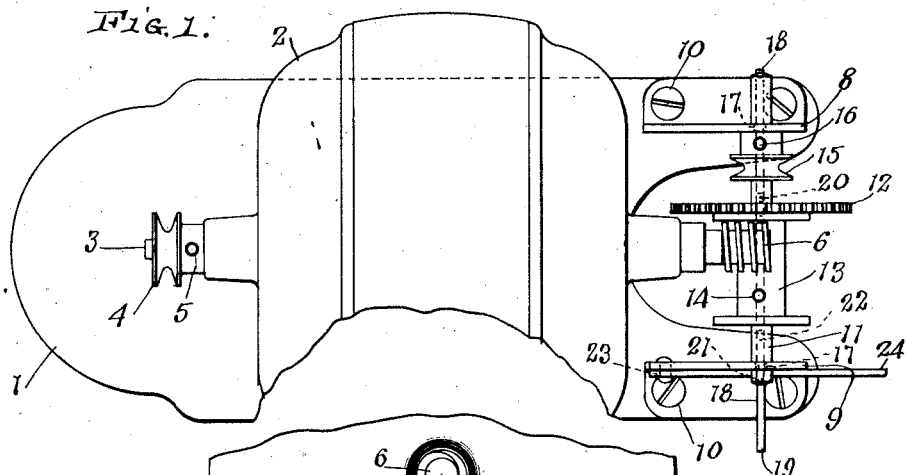
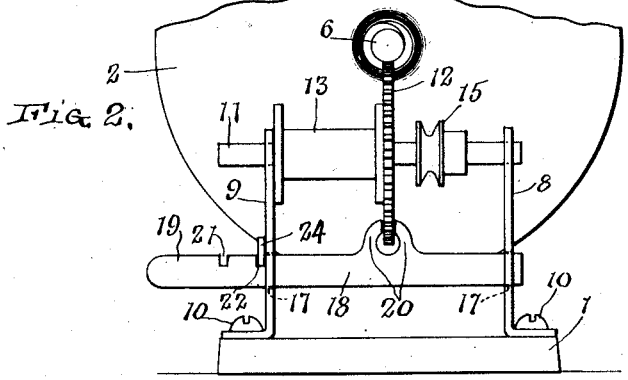
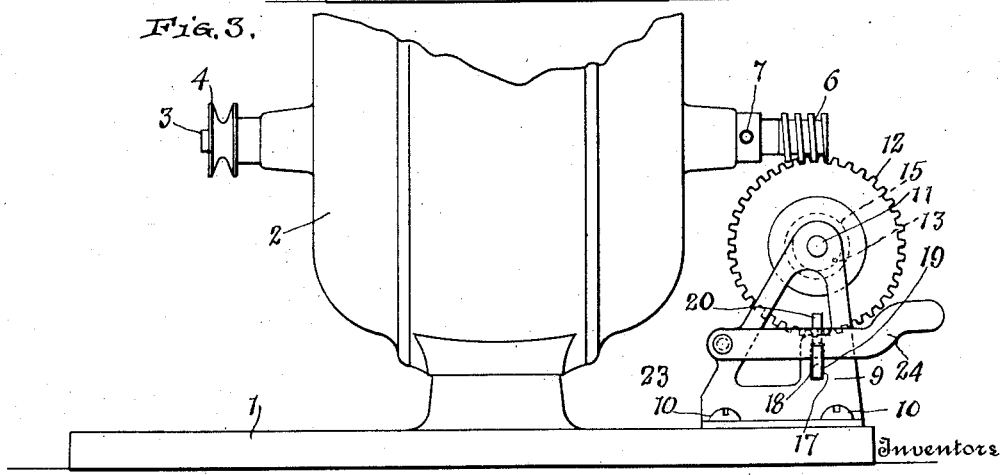
Inventors
Francis A. Wagner,
Forest H. Hartzell,
By Toulmin & Toulmin
Attorneys

UNITED STATES PATENT OFFICE.

FRANCIS A. WAGNER AND FOREST H. HARTZELL, OF DAYTON, OHIO, ASSIGNORS TO THE AMERICAN MECHANICAL TOY COMPANY, OF DAYTON, OHIO, A CORPORATION OF OHIO.

TRANSMISSION MECHANISM.

1,193,089.      Specification of Letters Patent.      Patented Aug. 1, 1916.

Application filed March 20, 1916. Serial No. 85,260.

*To all whom it may concern:*

Be it known that we, FRANCIS A. WAGNER and FOREST H. HARTZELL, citizens of the United States, residing at Dayton, in the county of Montgomery and State of Ohio, have invented certain new and useful Improvements in Transmission Mechanism, of which the following is a specification, reference being had therein to the accompanying drawing.

Our invention relates to power transmission mechanism.

It is an object of our invention to provide a means of transmission of power through gearing which will enable the speed of the driving shaft to be so reduced as to transmit power to machinery which must be driven at a speed much lower in rate than that of the driving shaft.

It is a further object of our invention to provide a means for throwing into and out of engagement the members of this power transmission mechanism by a simple movement and a simple structure.

It is a further object of our invention to provide a means of locking this mechanism either in or out of engagement of one part with another, and to accomplish this either while the mechanism is in motion or when at rest with equal facility.

It is an object of our invention to furnish various forms of connection between the power transmission mechanism and the mechanism to be driven, which can be utilized at the will of the operator.

It is another object of our invention to provide a power-driven shaft with either a direct drive or a drive which will reduce the speed of the shaft, either of which drives may be utilized at the will of the operator of the device.

In the accompanying drawings, Figure 1 is a plan view of the power transmission mechanism; Fig. 2 is an end elevation; and Fig. 3 is a side elevation.

In the embodiment of the invention here shown we have provided a suitable base 1 upon which is located a motor 2. The motor is provided with the usual motor shaft 3. At one end of this shaft we have detachably mounted a pulley 4 which is held fixed to the shaft by means of a screw 5. The opposite end of the shaft is provided with a detachable worm 6 which is held fixed to the shaft by means of a set screw 7. A pair of spaced vertical frame members 8 and 9 are also provided, these frame members being attached to the base by means of screws 10. The frame members are located at each side of the worm. A shaft 11 is rotatably journaled in the upper portion of the frame members, the shaft being of such length as to allow axial movement thereof within the bearings of the frame members. The shaft is provided with an enlarged worm wheel 12 and a drum 13 which are detachably fixed to the shaft by means of a set screw 14. The worm wheel is adapted to mesh with the worm 6. The shaft is also provided with a pulley 15 which is fixed to the shaft by means of a set screw 16. The worm wheel and the other parts upon the shaft are arranged to move as the shaft is moved axially, whereby the worm wheel is caused to engage and disengage the worm. We have provided suitable means for shifting this part of the mechanism and for this purpose the frame members 8 and 9 are provided with vertically extending slots 17 in which is slidably mounted a member 18. This member is provided with an end, indicated at 19, and constituting a handle. Located centrally of the member 18 and loosely embracing the worm wheel is a fork 20. The portion of the member 18 adjacent the frame member 9 is provided with a pair of spaced notches 21 and 22 and pivoted to this frame member 9 at 23 we have provided a detent 24 which is adapted to engage these notches to hold the member 18 either in such position as to keep the worm wheel 12 in mesh with the worm 6 or out of mesh therewith.

The shifting means can be operated easily and quickly to shift the worm wheel either into or out of mesh with the worm. All that is necessary is to lift the detent 24 and then shift the member 18. The arrangement of the several parts forms a very compact and unitary structure. The several pulleys can be easily operatively connected to any kind of a mechanism that it is desired to drive and the speed with which this mechanism can be driven can be easily varied by connecting the same with any one of a plurality of pulleys, the pulleys adjacent the worm giving a reduced speed and the pulley 4 giving a high speed to the mechanism to be driven.

Our invention is especially adaptable for driving toy devices of various kinds.

While we have shown and described one embodiment of our invention it will be understood that this has been chosen for the purposes of illustration only, and that we do not desire to be limited to the details of construction shown and described except as specified in the claims, for obvious modifications will occur to a person skilled in the art.

Having thus fully described our invention, what we claim as new and desire to secure by Letters Patent, is:—

1. The combination, with a motor comprising a base and a worm, of a frame mounted upon said base below said worm, a worm wheel rotatably journaled in said frame and adapted to mesh with said worm, said worm wheel being capable of axial movement, a device for shifting said worm wheel into and out of mesh with said worm, and a device to lock said shifting device in either position.

2. The combination, with a power driven worm, of a pair of spaced frame members, a rotatably and axially movable shaft journaled in said frame members, a worm wheel fixed to said shaft and adapted to mesh with said worm, a slide movably mounted on said frame member and provided with a fork loosely engaging said worm wheel, whereby said wheel may be moved into and out of mesh with said worm, said slide being provided with spaced notches, and means adapted to engage the notches to hold the wheel either in or out of mesh with said worm.

3. The combination, with a gear, of a pair of spaced frame members, a shaft journaled in said frame members, a second gear mounted upon said shaft, a member slidably mounted within said frame members and having a portion in engagement with said second gear, whereby the latter may be shifted into and out of mesh with said first-mentioned gear, said member being provided with spaced-apart notches adjacent one of the frame members, and a detent pivoted to the frame member adjacent the notches and adapted to engage the same to hold the second gear either in mesh or out of mesh with the first-mentioned gear.

4. The combination, with a motor comprising a base and a motor shaft provided with a gear, of a frame comprising spaced apart vertical members mounted on said base, a rotatably and axially movable gear journaled in said frame members and adapted to engage and disengage said first-mentioned gear, power transmitting devices connected to said last-mentioned gear, and means mounted on said spaced apart frame members for moving said last-mentioned gear to cause it to engage and disengage said first-mentioned gear.

5. The combination, with a source of power, of a pair of spaced apart frame members, a rotatably and axially movable shaft journaled in said frame members, a gear and power transmitting devices mounted on said shaft and connected to the source of power, and a slide mounted on said members at one side of said shaft and connected to the latter for shifting the gear to connect it to and disconnect it from the source of power.

In testimony whereof, we affix our signatures.

FRANCIS A. WAGNER.
FOREST H. HARTZELL.